Dec. 30, 1947.  C. H. ANGELL  2,433,726
APPARATUS FOR CONTACTING FLUIDS WITH SUBDIVIDED SOLIDS
Filed Nov. 29, 1943
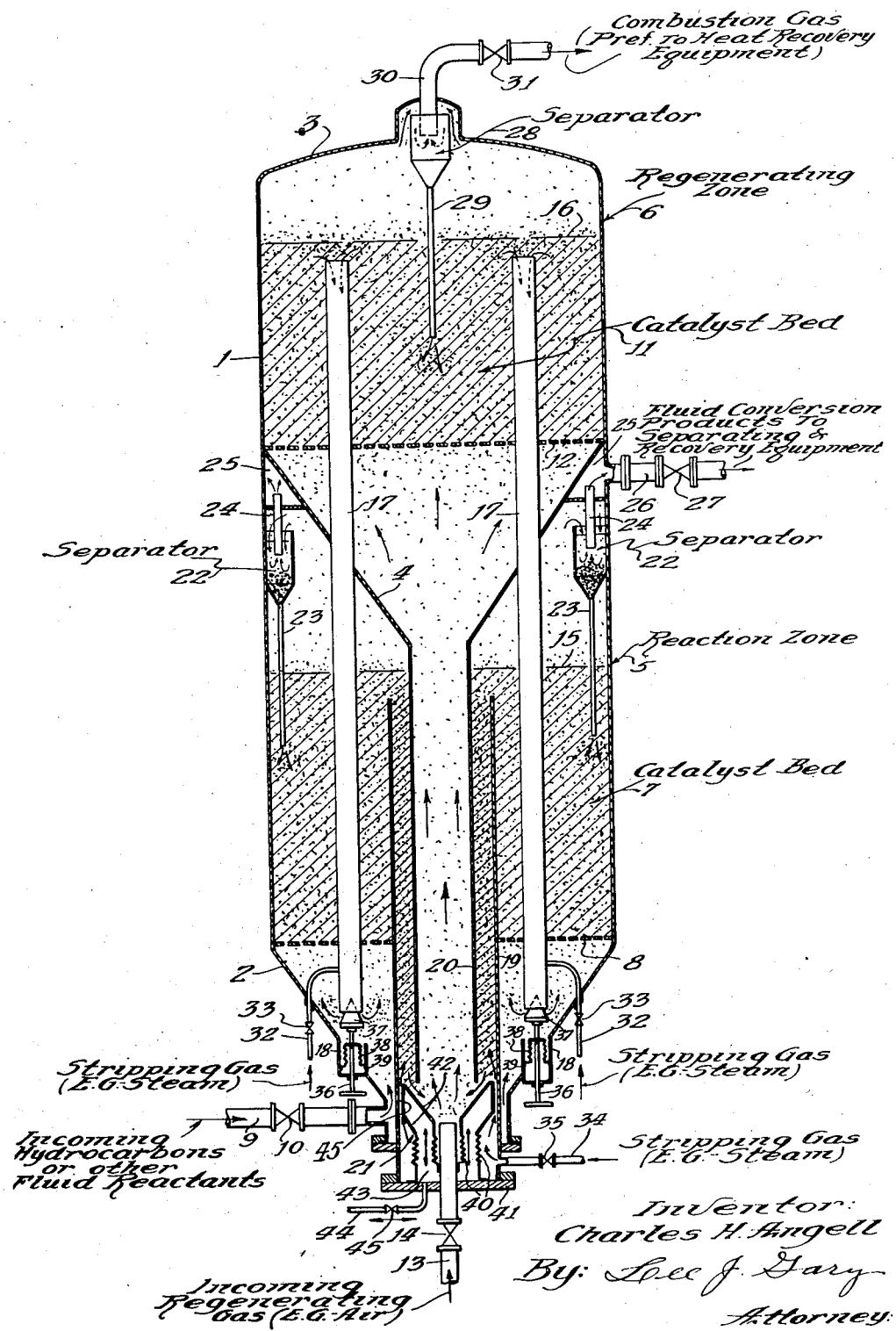

Patented Dec. 30, 1947

2,433,726

UNITED STATES PATENT OFFICE 2,433,726

APPARATUS FOR CONTACTING FLUIDS WITH SUBDIVIDED SOLIDS

Charles H. Angell, Chicago, Ill., assignor to Universal Oil Products Company, Chicago, Ill., a corporation of Delaware Application November 29, 1943, Serial No. 512,117

5 Claims. (Cl. 196—52)

The invention relates to an improved process involving contact between fluids and subdivided solids and to an improved form of apparatus in which such a process may be conducted.

The invention is not limited to the specific fluids and subdivided solids contacted since its features will be found advantageous as applied to numerous specific operations involving contact between various types of subdivided solid materials and fluids, for treatment of either or both the solid and the fluid materials or for effecting the conversion of one or both. However, the features of the invention are particularly advantageous as applied to the conversion of fluid hydrocarbons in contact with subdivided solid catalysts which promote the desired conversion reaction and/or retard undesirable secondary or side reactions, accompanied by continuous regeneration of the catalyst which becomes contaminated by the deposition thereon of deleterious combustible products of the conversion reaction. Regeneration of the catalyst is effected by burning combustible contaminants therefrom in a stream of oxidizing gas and the conversion reaction and regeneration of the catalyst are accomplished simultaneously in separate confined reaction and regenerating zones through which the subdivided solid catalytic material is circulated.

The specific reactions of catalytic cracking, dehydrogenation, aromatization, hydrogen transfer and combinations of such reactions exemplify operations of the general type to which the features of the invention are particularly directed. A description of the improved process herein provided as applied to the catalytic cracking of hydrocarbons will serve to illustrate the features and advantages of the invention and the subsequent description will therefore be directed particularly to such an operation and to the improved form of apparatus in which it is conducted.

The accompanying diagrammatic drawing is an elevational view, shown principally in section, of one specific form of the apparatus provided by the invention and the following description of the apparatus includes a description of the mode of operation provided.

Referring to the drawing, the apparatus here illustrated comprises a vertically elongated, substantially cylindrical vessel formed by an outer shell 1, an inverted substantially conical lower head 2, an upper head 3 and having an intermediate partition 4 of inverted substantially conical form which divides the vessel into a lower compartment comprising the reaction zone 5 and an upper compartment comprising the regenerating zone 6.

A bed of subdivided solid catalyst or contact material indicated at 7 is maintained within the reaction zone above a perforate plate or other suitable form of distributing grid 8 disposed at substantially the junction of the cylindrical shell 1 with the cone bottom 2 of the vessel. This bed is maintained in a fluid-like condition of relatively high solid particle concentration by the uptively high solid particle concentration by the upward passage therethrough of fluid reactants and resulting fluid conversion products at a velocity regulated to partially counteract the force of gravity on the solid particles of the bed and cause their hindered settling. The reactants are supplied to the lower portion of the vessel beneath the distributing grid 8 through line 9 and valve 10 either in normally liquid or essentially vaporous state or in a mixed phase condition and they may, when desired, be preheated before being supplied to the reactor to substantially the temperature desired for conducting the reaction or to any desired lower temperature.

Another bed of subdivided solid catalyst or contact material, indicated at 11, is maintained within the regenerating zone above a perforate plate or suitable form of distributing grid 12 disposed at substantially the junction of shell 1 with the partition 4. This bed is also maintained in fluid-like condition of relatively high solid particle concentration by the upward passage therethrough of oxidizing gas employed to accomplish regeneration of the catalyst and resulting combustion gases at a velocity regulated to partially counteract the force of gravity on the solid particles within the bed and cause their hindered settling. The regenerating gas, which preferably is air or may be air diluted with $CO_2$, combustion gases or other suitable substantially non-oxidizing gas, is supplied to the vessel, either preheated or at substantially atmospheric temperature through line 13 and valve 14 and thence into the regenerator, as will be later described.

By suitable control of the rates at which fluid reactants and regenerating gas are supplied, respectively, to the reaction and regenerating zones in relation to the horizontal cross-sectional area of the beds 7 and 11, and in relation to the average particle size and weight of the subdivided solid catalyst or contact material and by keeping the catalyst inventory within the vessel at a substantially constant volume, together with the method and means provided for circulating and controlling circulation of the subdivided solid material between the reaction and regenerating zones, the upper extremities of the fluid-like beds 7 and 11 are each maintained at a suitable level beneath the points within the respective zones from which the outgoing fluid conversion products and the outgoing gaseous products of regeneration are withdrawn. The approximate upper extremity of the relatively dense fluid bed 7 is indicated at 15 and the approximate upper extremity of the relatively dense fluid bed 11 is indicated at 16. By virtue of this provision, a space is maintained in the reaction and regenerating zones above the respective fluid beds 7 and 11 in which the concentration of solid particles is greatly reduced as compared with that prevailing within the beds. Thus, a major separation of solid particles from the outgoing fluid conversion products and regenerating gas is effected at the approximate interface between the fluid-like bed and the light phase existing above it.

Although a relatively sharp interface or line of demarcation between the fluid beds and the light phases is indicated at 15 and 16 in the drawing, this interface is more in the nature of a band or region of rapidly decreasing solid particle concentration. The density in the fluid beds may range, for example, from 5 to 30 pounds, or thereabouts, per cubic foot, while the density in the light phases adjacent the points in the reaction and regenerating zones from which fluid conversion products and outgoing gaseous products of regeneration are discharged may be as low as one pound or a fraction of a pound per cubic foot. The average density in the conical sections 2 and 4 of the vessel are also less than the densities in the respective beds 7 and 11 due to the higher average vapor and gas velocities in these zones, the velocity decreasing and the density increasing as the vapor or gas approaches the wide portion of the cone.

As above indicated, fluidization of the beds and control of the interface between the bed and the light phase above it depends upon a number of factors. The diameter of the vessel or, more specifically, the horizontal cross-sectional area of the bed, and the rate at which reactants and regenerating gases are supplied to the reaction and regenerating zones determine the upward velocity of the vapors and/or gases passing through the beds. This velocity in relation to the density and depth of the bed determines the pressure drop therethrough, and the density of the bed, in turn, at any given velocity is related to the average particle size and weight of the catalyst or contact material. Thus, in a vessel of given size and with a specific catalyst or contact material, both of which factors are fixed in any given operation, there is a critical vapor or gas velocity at which the particles begin to be agitated or lifted and fluidization of the bed begins to take place. Beyond this point an increase in the vapor or gas velocity causes no substantial pressure drop through the bed, but an increased velocity beyond this point will decrease the density or solid particle concentration of the bed. Thus, the preferred condition for operation of the process provided by the invention with fluidization of the beds is with a velocity somewhat above the aforementioned critical value and this can be determined by measurement of the pressure drop through the bed. It has been found that the critical velocity is reached when the pressure drop through the bed is approximately equivalent to the bulk density of the bed. Thus, in a vessel of given size for any given average particle size and weight of the catalyst or contact material, the minimum velocity required to fluidize a bed of the desired depth can be determined and the rates at which reactants and regenerating gas are supplied to the vessel can be adjusted to give the desired degree of fluidization.

To insure that the upper extremities of the fluid beds are maintained beneath the gas and vapor outlets so as to insure maintenance of the desired two-phase condition within the reaction and regenerating zones, solid particles to be transferred from the regenerator to the reactor are withdrawn from beneath the desired upper extremity of the fluid bed 11 and solid particles to be transferred from the reactor to the regenerator are withdrawn from beneath the desired upper extremity of the fluid bed 7. In addition, it is necessary to keep the rate at which the solid particles are passed from the reaction zone to the regenerating zone substantially the same as the rate at which they are returned from the regenerating zone to the reaction zone. In the case here illustrated, these features of the operation are accomplished by providing one or a plurality of suitable transfer conduits or standpipes, indicated at 17, extending from an elevation within and preferably adjacent the upper extremity of bed 11 in the regenerating zone downwardly to a suitable lower point within bed 7 in the reaction zone or, as in the case illustrated, to within the zone of higher velocity and lower solid particle concentration defined by cone bottom 2 of the vessel. Conduits 17 are open at their upper ends to admit solid particles from the bed 11 and a suitable flow regulating valve, indicated at 18, is provided adjacent the lower end of each of these transfer lines to give a slight drop in pressure at the discharge end of conduits 17 and control the rate of circulation through these conduits. To complete the cycle of catalyst or contact material, transfer lines or conduits 19 and 20 are provided. Conduit 19 extends from a suitable point in bed 7 beneath and preferably adjacent its upper extremity 15 to a relatively low point in the vessel beneath the distributing member 8 and is provided adjacent its lower end with a flow regulating device 21. The downcoming relatively dense column of catalyst or contact material passes over the upper surface of member 21 into the incoming stream of regenerating gas supplied through line 13 to be picked up by the latter and transported principally by its gas-lift action through conduit 20 into the conical lower section 4 of the regenerator. Member 21 also maintains a slight pressure drop at the discharge end of conduit 19.

The density of the columns of solid particles in conduits 17 is greater than the density in bed 7 and the height of the columns in conduits 17 is sufficient to insure a higher hydrostatic pressure at their discharge ends than that prevailing in the zone into which they discharge. The solid particles from conduits 17 meet and are dispersed in the stream of incoming fluid reactants supplied through line 9 and the latter carry the solid particles through the distributing member 8 into the fluid bed wherein desired conversion of the reactants is accomplished in the presence of the relatively concentrated mass of solid particles.

The mechanism whereby solid particles are transferred from bed 7 to bed 11 is the same in principle as above described for transferring solid particles from bed 11 to bed 7. The density and height of the column of solid particles in conduit 19 gives a higher hydrostatic pressure at its discharge end than that prevailing in conduit 20. The incoming stream of regenerating gas supplied through line 13 transports the catalyst upwardly through line 20 and the conical section 4 of the regenerator and through the perforate distributing member 12 into bed 11. In bed 11 the oxidizing gas employed for regeneration burns from the solid particles combustible contaminants accumulated thereon in the reaction zone and thus effects their regeneration. A large portion of the heat evolved by burning of the combustibles is stored in the subdivided solid particles and supplied therewith to the reaction zone to furnish all or a substantial portion of the heat required for conducting the conversion reaction.

One or a plurality of separators of the centrifugal or cyclone type, indicated at 22, is provided in the upper portion of the reaction section of the vessel to effect a more complete separation of solid particles from the outgoing stream of fluid conversion products. The vapors or gases and entrained solid particles enter the cyclone separators 22, as indicated by the arrows, from the light phase in the reaction zone above bed 7 and solid particles separated therein are returned through standpipes 23 to bed 7. The vapors and gases from which substantially all of the solid particles have been separated are directed through conduits 24 into an outlet compartment or header 25 from which the fluid conversion products are directed through line 26 and the pressure control valve 27 to suitable fractionating and recovery equipment which does not constitute a novel part of the invention and is not illustrated.

A similar separator, preferably of the centrifugal or cyclone type is disposed, as indicated at 28, in the upper portion of the regenerating section of the vessel and receives outgoing combustion gases and entrained solid particles from the light phase above the fluid bed 11 in this zone. The separated solid particles are returned from separator 28 through standpipe 29 to bed 11. The combustion gases are directed from the separator through line 30 and the pressure control valve 31, preferably to suitable heat recovery equipment, not illustrated, such as, for example, a steam generator and/or superheater, hot gas turbine or the like, provided for the recovery of useful heat energy from these gases.

To prevent the transfer of occluded oxidizing gas and combustion gases through conduits 17 into the reaction zone with the solid particles being transferred thereto from the regenerator, suitable stripping gas is introduced into these conduits at one or a plurality of points on the upstream sides of valves 18. This stripping gas may comprise, for example, steam or other suitable relatively inert or non-oxidizing gas and its upward passage through conduits 17 in relatively small quantities serves to prevent excessive compaction of the columns of solid particles in these lines so as to insure the flow of solid particles therethrough. The rate at which stripping gas is supplied is regulated to accomplish the aforesaid purposes without excessive fluidization of the columns so that the density of the latter remains relatively high. Lines 32 and valves 33 are provided, in the case illustrated, for the introduction of stripping and aerating gas into conduits 17.

In a similar manner, suitable stripping and aerating gas, such as steam, for example, is supplied through line 34 and valve 35 to conduit 19 beneath the flow control member 21 and is directed through a relatively small concentric space 45 between the flow control member and conduit 19 upwardly into the downwardly moving column of solid particles passing through the latter to substantially strip this column of occluded vapors and gases so as to prevent passage of the latter from the reactor into the regenerator and to prevent excessive compaction of the column.

It is within the scope of the invention to substitute a fixed orifice or the like adjacent the lower end of conduits 17 for the flow control valves 18 and/or to substitute a fixed orifice or the like adjacent the lower end of conduit 19 for the flow regulating device 21. Preferably, however, to permit variation of the rate at which solid particles are transferred between the reaction and regenerating zones, an adjustable flow regulating device is provided either at the lower end of conduits 17 or adjacent the lower end of conduit 19, or both.

In the case illustrated, valves 18 are of special construction which avoids packing of the valve stems 36 where the protrude through the wall of the vessel. The cone or flow restricting member 37 of each valve is attached to a flexible bellows member or the like 38 and the free end of the valve stem 36 bears against the inner surface of the end of this bellows member to effect adjustment of the position of member 37 in relation to the end of conduit 17 by lowering or raising the valve stem. The bellows member 38 is disposed within a suitable shell or housing 39 and the lower end of the bellows is secured to this housing, its upper end being free to move upon expansion or contraction of the bellows.

Also, in the particular case illustrated, the flow regulating device 21 is of special form employing a flexible bellows member or the like 40 secured at its lower end to a flange 41, provided as a closure member for the lower end of conduit 19 and secured at its upper end to a substantially cone-shaped element 42 which directs the solid particles from conduit 19 into conduit 20 and restricts flow therebetween to a degree depending upon the proximity of element 42 to the end of conduit 20. Expansion and contraction of the bellows member 40 with consequent upward and downward movement of element 42 is effected by injecting a suitable fluid into the confined space 43 of the flow control device 21 through line 44, and valve 45 and by withdrawing fluid therefrom through the same line. A similar arrangement for pneumatic or hydraulic control of valves 18 may be substituted, when desired, for the manually adjustable stems 36 of these valves or member 21 may be arranged for manual adjustment. In fact it is not intended to limit the invention to flow regulating members of the form illustrated, since many other suitable forms will be readily apparent.

It is also within the scope of the invention to employ separate reaction and regenerating vessels instead of dividing a single vessel, as illustrated, into separate reaction and regenerating zones. However, the regenerating zone is preferably disposed above the reaction zone or vice versa so that a relatively straight transfer conduit, like conduit 20, may be employed for the transfer of solid particles from the upper to the lower zone. This avoids excessive wear due to erosion encountered at bends in a transfer line of this type wherein the vapor or gas velocity is relatively high. The use of a relatively short, straight transfer line at this point permits the use of higher velocities and higher transfer rates in a line of given size than can be safely employed when the line is relatively long and/or contains one or more bends. By thus reducing wear or erosion in this transfer conduit, which would be caused by the passage of solid particles around a bend in the line at high velocity, excessive attrition of the solid particles is also obviated.

The relatively straight transfer conduits 17 and 19 are also important features of the invention which assist in facilitating circulation of the solid particles between the reaction and regenerating zones and help to avoid excessive attrition of the solid particles. However, the advantage of using relatively straight transfer lines, wherein the velocity of the solid particles is relatively low due to the relatively high density of the columns, is not so pronounced as in the high velocity transfer line 20 and the invention is not limited to the use of the straight transfer lines 17 and 19.

Another feature of the preferred embodiment of the invention illustrated is the relatively simple and compact construction of the apparatus and the elimination of external transfer lines. This latter feature is accomplished, in part, by disposing conduit 19 about conduit 20 and bringing its upper end to adjacent the upper extremity of bed 7, so that a suitable pressure head is developed in the latter without extending it beneath the vessel. This materially reduces the required overall height of the equipment which in previous installations not employing the features of the invention is ordinarily a minimum of one hundred feet, or thereabouts, above the ground level.

I claim:

1. An apparatus in which to effect contact between fluids and subdivided solids which comprises, in combination, two confined contacting zones arranged in superimposed relation, each zone being adapted to retain therein a bed of subdivided solid contact material, means for supplying a separate stream of fluid to each of said zones and for passing the same upwardly in contact with the respective beds at controlled velocity, means for discharging a resulting stream of fluid from the upper portion of each of said beds and from the respective zones, means for transferring solid particles between said beds from the upper to the lower zone comprising a conduit leading downwardly from a point of the bed in the upper zone beneath its upper extremity and communicating at its lower end with the bed in the lower zone, means for transferring solid particles between said beds from the lower to the upper zone comprising a pair of concentric vertical conduits disposed within said lower zone, the outer of said concentric conduits leading downwardly from a point of the bed in the lower zone beneath its upper extremity into the lower end of the inner of said concentric conduits and said inner conduit communicating at its upper end with said bed in the upper zone, means for passing said stream of fluid being supplied to the upper zone through the inner conduit, and means for regulating the rate at which solid particles are passed through said conduits.

2. An apparatus in which to effect contact between fluids and subdivided solids which comprises, in combination, two confined contacting zones arranged in superimposed relation, each zone being adapted to retain therein a bed of subdivided solid contact material, means for supplying a separate stream of fluid to each of said zones and for passing the same upwardly in contact with the respective beds at controlled velocity, means for discharging a resulting stream of fluid from the upper portion of each of said beds and from the respective zones, means for transferring solid particles between said beds from the upper to the lower zone comprising a substantially straight conduit leading downwardly from a point of the bed in the upper zone beneath its upper extremity and communicating at its lower end with the bed in the lower zone, means for transferring solid particles between said beds from the lower to the upper zone comprising a pair of concentric vertical conduits disposed within said lower zone, the outer of said concentric conduits leading downwardly from a point of the bed in the lower zone beneath its upper extremity into the lower end of the inner of said concentric conduits and said inner conduit communicating at its upper end with said bed in the upper zone, means for passing said stream of fluid being supplied to the upper zone through the inner conduit, and means for regulating the rate at which solid particles are passed through said conduits.

3. An apparatus in which to effect contact between fluids and subdivided solids which comprises, in combination, two confined contacting zones arranged in superimposed relation, each zone being adapted to retain therein a bed of sub-divided solid contact material, means for supplying a separate stream of fluid to each of said zones and for passing the same upwardly in contact with the respective beds at controlled velocity, means for discharging a resulting stream of fluid from the upper portion of each of said beds and from the respective zones, means for transferring solid particles between said beds from the upper to the lower zone comprising a substantially straight open-ended conduit leading downwardly from a point of the bed in the upper zone beneath its upper extremity and terminating at its lower end within the lower portion of the lower zone, means for transferring solid particles between said beds from the lower to the upper zone comprising a pair of concentric vertical conduits disposed within said lower zone, the outer of said concentric conduits leading downwardly from a point of the bed in the lower zone beneath and adjacent its upper extremity into the lower end of the inner of said concentric conduits and said inner conduit communicating at its upper end with said bed in the upper zone, means for passing said stream of fluid being supplied to the upper zone through the inner conduit, and means for regulating the rate at which solid particles are passed through said conduits.

4. An apparatus of the class described comprising, in combination, a vertically elongated substantially cylindrical vessel having an upper and a lower head and an intermediate partition dividing the vessel into upper and lower compartments, a valved inlet conduit for supplying fluid to the lower portion of the lower compartment, a substantially straight transfer conduit open at its upper end and having pressure reducing means disposed adjacent its lower end, said transfer conduit extending vertically downward within the vessel from said upper to said lower compartment, a second transfer conduit, open at its upper end and provided with pressure reducing means adjacent its lower end, extending vertically within the lower compartment from adjacent said partition to adjacent the lower head of the vessel, a third substantially straight transfer conduit open at its opposite ends and extending vertically from a point within said second conduit adjacent the last named pressure reducing means into communication through the partition with said upper compartment, means for supplying fluid to the lower end of the last named conduit and therethrough into said upper compartment, and means for removing a separate stream of fluid from each of said compartments.

5. A contacting apparatus comprising a vertically elongated vessel, partitioning means dividing the vessel into an upper compartment and a lower compartment, a fluid inlet at the lower portion and a fluid outlet at the upper portion of the last-named compartment, a vertical transfer conduit within the vessel extending from a point in the upper compartment to a point adjacent the lower portion of the lower compartment, a pair of concentric vertical conduits disposed within the lower compartment, the outer of said concentric conduits having an open upper end in the upper portion of the lower compartment and the inner of said concentric conduits having an open lower end adjacent the lower portion of the lower compartment and communicating at its upper end with said upper compartment, means for supplying fluid to the lower end of said inner conduit and upwardly therethrough into the upper compartment, and means for removing fluid from the upper compartment.

CHARLES H. ANGELL.

REFERENCES CITED

The following references are of record in the file of this patent:

UNITED STATES PATENTS

| Number | Name | Date |
| --- | --- | --- |
| 2,046,816 | Fowler et al. | July 7, 1936 |
| 2,212,583 | Broderson et al. | Aug. 27, 1940 |
| 2,302,209 | Goddin | Nov. 17, 1942 |
| 2,311,564 | Munday | Feb. 16, 1943 |
| 2,347,682 | Gunness | May 2, 1944 |
| 1,380,067 | Koch et al. | May 31, 1921 |
| 1,601,938 | Campbell | Oct. 5, 1926 |
| 1,845,058 | Pier | Feb. 16, 1932 |
| 1,989,406 | Doolittle | Jan. 29, 1935 |
| 2,304,128 | Thomas | Dec. 8, 1942 |
| 2,341,193 | Scheineman | Feb. 8, 1944 |
| 2,363,874 | Krebs | Nov. 28, 1944 |

FOREIGN PATENTS

| Number | Country | Date |
| --- | --- | --- |
| 533,037 | Germany | Sept. 8, 1931 |